Figure 1:
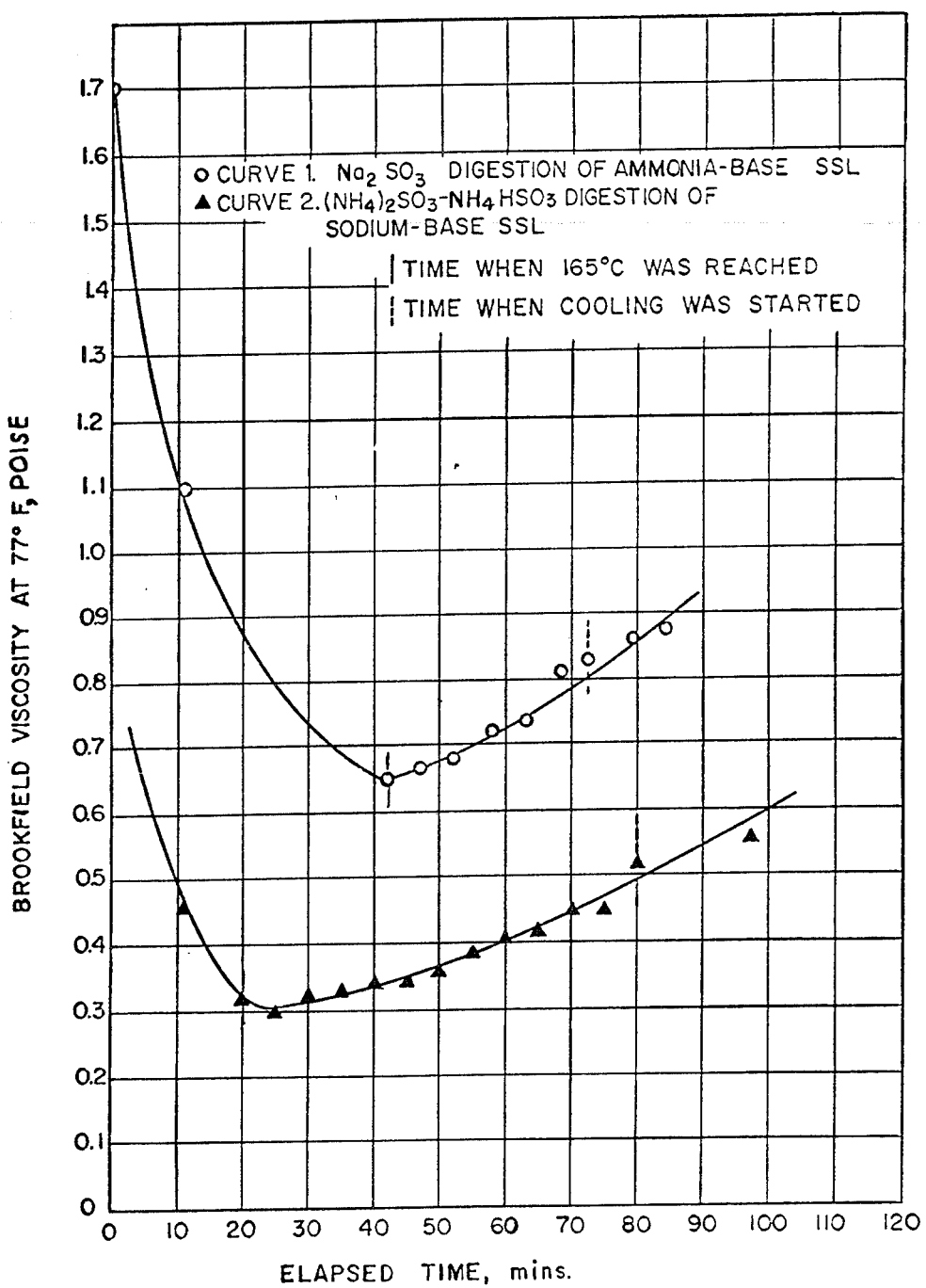

# United States Patent

Steinberg et al.

[15] 3,668,123
[45] June 6, 1972

[54] DISPERSANTS FROM SPENT SULFITE LIQUOR

[72] Inventors: John Charles Steinberg; Kenneth Russell Gray, both of Shelton, Wash.

[73] Assignee: International Telephone & Telegraph Corporation, New York, N.Y.

[22] Filed: Dec. 11, 1969

[21] Appl. No.: 884,246

Related U.S. Application Data

[63] Continuation of Ser. No. 688,264, Dec. 5, 1967, Pat. No. 3,505,243, which is a continuation of Ser. No. 432,761, Feb. 15, 1965, abandoned, which is a continuation-in-part of Ser. Nos. 95,190, Mar. 13, 1961, abandoned, and Ser. No. 174,595, Feb. 20, 1962, abandoned.

[52] U.S. Cl. .......................... 252/8.5 C, 252/353, 260/124 R
[51] Int. Cl. .......................................................... C10m 3/48
[58] Field of Search ............................. 252/8.5 C; 260/124 R

[56] References Cited

UNITED STATES PATENTS

| 2,822,358 | 2/1958 | Hearon et al. | 260/124 |
| 2,935,473 | 5/1960 | King et al. | 260/124 X |
| 3,025,235 | 3/1962 | Smith et al. | 252/8.5 |
| 3,505,243 | 4/1970 | Steinberg et al. | 252/8.5 X |

OTHER PUBLICATIONS

Rogers, Composition and Properties of Oilwell Drilling Fluids, Third Edition, Pub. 1953, pages 417– 421.

*Primary Examiner*—Herbert B. Guynn
*Attorney*—C. Cornell Remsen, Jr., Walter J. Baum, Percy P. Lantzy, J. Warren Whitesel, Delbert P. Warner and James B. Raden

[57] ABSTRACT

A drilling mud composition is produced having a dispersant composition therein. The dispersant composition is prepared by incorporating a soluble sulfurous acid salt of sodium, potassium or ammonia into an aqueous solution containing soluble-base spent sulfite liquor. The spent sulfite liquor includes the reducing sugars from the sulfite pulping of wood. This solution is heated for a period of time sufficient to produce a product having a viscosity such that after complexing with a chromium salt it exhibits dispersant properties in drilling muds.

2 Claims, 3 Drawing Figures

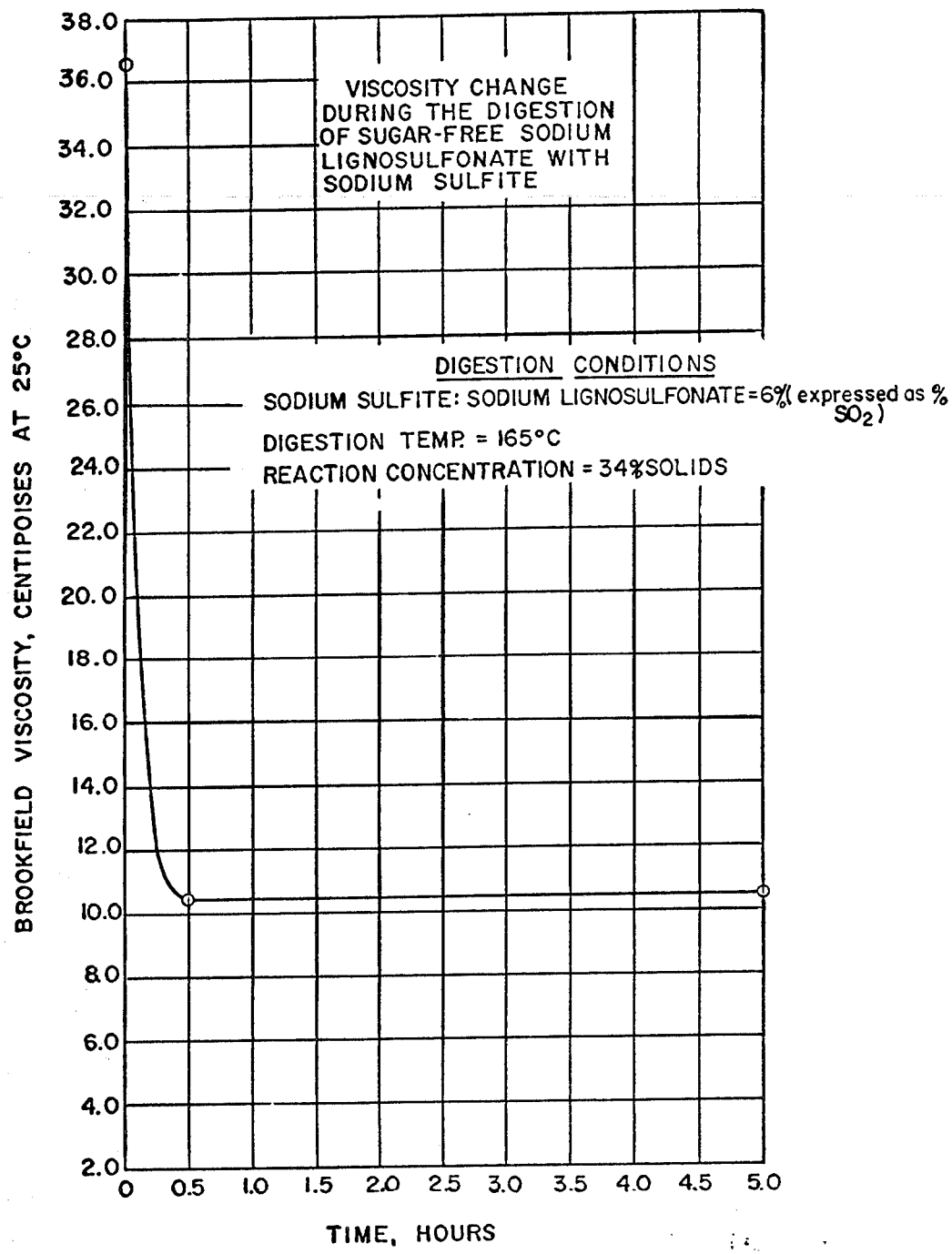

DISPERSANTS FROM SPENT SULFITE LIQUOR

This application is a continuation of our copending application, Ser. No. 688,264, filed Dec. 5, 1967, now U.S. Pat. No. 3,505,243, which is a continuation of application Ser. No. 432,761, filed Feb. 15, 1965, now abandoned, which, in turn, is a continuation-in-part of our applications, Ser. No. 95,190, filed Mar. 13, 1961 now abandoned, and Ser. No. 174,595, filed Feb. 20, 1962, now abandoned.

This invention relates to the utilization of the soluble-base spent sulfite liquors (for convenience, some times called SSL) from the acid-sulfite pulping of wood, especially to their conversion to modified lignosulfonate dispersants and has for its object the provision of an improved process for treating such liquors, and conversion products having improved properties. The term modified lignosulfonate product is used herein as a convenient name for an unidentified complexed polymeric material derived from the components of spent sulfite liquor in a digestion process which has changed the chemical structure of the components including the ligneous components. The invention provides an efficient process for eliminating the undesirable effects of the sugars in soluble-base spent sulfite liquor by converting the sugars to compounds which are, in themselves and in combination with lignosulfonates, effective dispersants. The invention also effects, concurrently with the conversion of the sugar, variations in and the control of the colloidal behavior of the modified lignosulfonate product through depolymerization with or without subsequent repolymerization and through additional sulfonation.

The process of the invention not only converts the sugars to other bodies having useful functions ( e.g., dispersing actions) but also results in the initial depolymerization of the liquor and, if continued for a sufficient length of time, eventual polymerization. Thus, a very great range of control of viscosity can be obtained in products having various degrees of depolymerization, having been neither polymerized nor depolymerized, or having varying degrees of polymerization.

Lignosulfonates of suitable characteristics are known to be effective dispersants for slurries of many types of insoluble particles, such as clays in the form of drilling muds or slurries of ceramic clays, cement slurries, etc. In such uses, they have the property of markedly reducing the viscosity of the slurries or of substantially decreasing the water required to obtain a flowable slurry. Lignosulfonates are available at little or no cost in crude form as spent sulfite liquors from the acid-sulfite pulping of wood. The presence of a large content of reducing sugars in such spent sulfite liquor, however, renders the lignosulfonate content unsuitable for many applications. Not only are the sugars diluents which reduce the dispersivity, but such sugars in themselves have harmful effects in many dispersant applications. Thus, in drilling muds, sugars tend to cause fermentation which is harmful to the mud and objectionable from the standpoint of unpleasant odors. In regard to use of lignosulfonate for dispersing cements, the presence of reducing sugars leads to undesirable retardation of cure as well as adversely affecting finished properties of concrete containing crude spent sulfite liquor. Furthermore, for many industrial applications, dispersants are desired in the form of dry powders, either for convenience in handling and storage or to permit incorporation in other dry products through blending ( e.g., dispersants in wettable pesticide powders). For such applications, crude spent sulfite liquor solids, irrespective of their dispersing effectiveness, are unsuitable or undesirable because of their hygroscopicity attributable to their content of sugars.

Many procedures have been suggested or used for the removal or destruction of all or a substantial part of the sugars in the spent sulfite liquor. These procedures include: fermentation to alcohol, precipitation of insoluble lignosulfonate salts, anion exchange, alkaline degradation, and thermal destruction. A characteristic of each of these procedures is a change in the sugars, as by their destruction, or removal of the sugars, so that they do not remain in any useful form in the lignosulfonate.

When sugars are decomposed simply by thermal means, complex dark-colored materials of humin or tarry nature, or even insoluble chars, are formed. Such products not only are ineffective as dispersants but are highly undesirable as components of a dispersant. When sugars in spent sulfite liquors are decomposed solely by thermal action, not only are such undesirable tarry or humin products formed, but also unreactive intermediates in the product of humin substances will react with lignosulfonate to give polymerized products of considerably higher viscosity than that of the starting lignosulfonate. Such lignosulfonate products, desugared solely by thermal action, are objectionable not only from the standpoint of generally dark color but also from the standpoint that the humin or tarry materials are inert as dispersants. The lignosulfonate products having increased polymerization do not have sufficient solubility or hydrophilic nature to be effective for dispersants in high electrolyte environments as concrete and contaminated drilling muds. The sugars in spent sulfite liquors can be destroyed as sugar entities without the undesirable polymerization of lignosulfonate and without the formation of humin and tarry bodies by heating in the presence of alkalis. However, as is well known, alkaline degradation of sugars results in fragmentation to form low molecular weight hydroxy acids in the form of alkali metal salts. Such resultant contamination of lignosulfonate with low molecular weight fission products of sugars in the form of sodium salts or acids is undesirable as regards effectiveness of the products in many uses.

The sugar conversion process of our invention is based on our discovery that by digesting soluble-base spent sulfite liquors in concentrated form at suitable temperatures with suitable quantities of sulfite or bisulfite anion or mixtures thereof, new products are formed. The process converts sugars to effective dispersants whether digested alone or in the presence of lignosulfonates, and the sulfonates also undergo significant polymeric changes. In the digestion process of our invention, the sugars are not converted into excessively dark-colored humin or tarry bodies, nor do their conversion products convert the lignosulfonates into polymers of undesirably high molecular weight.

When soluble-base sulfite liquors are digested by the process of our invention, the viscosity of the concentrated reaction mixture initially drops rapidly ( depolymerization occurs), during which period the sulfite anion or bisulfite anion or mixtures thereof are largely consumed. Thereafter, the viscosity of the reaction mixture commences to rise ( repolymerization occurs), but the reaction is not allowed to proceed beyond the point where the viscosity exceeds that of the original reaction mixture. The invention results in modified lignosulfonates of improved characteristics, free from objectionable features of sugars, which modified lignosulfonates may be (1) depolymerized to varying degrees and additionally sulfonated or (2) repolymerized in a different manner from that existing originally but having no net gain in polymerization, as measured by viscosity, over that of the original reaction mixture.

Evidence based on use of $C_{14}$-labeled, radioactive wood sugar indicates that the increase in viscosity is due primarily to copolymerization of lignosulfonate with reactive conversion products of the sugars, which conversion products entering into copolymerization are indicated by ultraviolet spectroscopy studies to be, at least to a large degree, furan structures. Through the additional sulfonation effected by the sulfite or bisulfite anion in our process, and through combination with the depolymerized lignosulfonate, such furan structures are, however, stabilized such that humin bodies with objectionably low solubility and dark color are not formed. A novel feature of our invention is that the copolymerization to produce novel effective dispersants can take place without any increase in polymerization or viscosity over the original lignosulfonate, in that a depolymerization is first effected.

The initial reaction mixtures fed to the digestion step of our invention may be either acid or alkaline but, as the reaction proceeds, will usually become acidic or at least neutral. Since the concentrated soluble-base spent sulfite liquors used in our process are acidic (e.g., pH of 2–4), sodium sulfite used as the digestion chemical will initially be partially converted to the bisulfite. Further development of acidity in the reaction mixture will be most pronounced when the reaction is allowed to proceed past the point of maximum depolymerization and substantially into the repolymerization stage. The rate of repolymerization may be increased and the time for this step shortened by employing a relatively high concentration of hydrogen ion (i.e., through the use of bisulfite in conjunction with the natural acidity of the liquor, giving a final low pH in the reaction mixture suitably of the order of pH 1–4). Alternatively, the repolymerization may be hastened by the presence of ammonium cation corresponding to part or all of the sulfite or bisulfite anion present. However, irrespective of whether or not the repolymerization is hastened through use of relatively high concentration of hydrogen ion or through the presence of ammonium ion, the reaction, in any event, is terminated before the viscosity of the product liquor exceeds that of the initial reaction mixture. Where, for example, the product of our invention may be intended for application in a high lime environment, such as a cement dispersant or as a soil amendment to diffuse readily through the soil, we may prefer to terminate the reaction near the point of maximum depolymerization. On the other hand, in the case of a product produced as a drilling mud additive, we may prefer to control repolymerization at a point approaching that of the original reactant mixture. In any event, great flexibility of product characteristics is obtained through depolymerization, additional sulfonation, conversion of sugar residues to active dispersing entities and copolymerization products or through controlled repolymerization where desired. Also, the products of the invention, when in dried form, exhibit free-flowing properties comparable to those of lignosulfonates which have been freed of sugars by more complex or expensive means.

The term "soluble-base" spent sulfite liquor as used herein refers to spent sulfite liquor derived from the pulping of wood with a solution containing sulfurous acid and sodium, ammonium or potassium bisulfite. Such spent sulfite liquors have a relatively low pH (e.g., 1.5–4.0) and the lignin contained therein is considered to be in the form of lignosulfonic acids and lignosulfonic acid salts of the soluble-base. Such liquors also contain large quantities of reducing sugars, predominantly mannose and glucose, derived through hydrolysis of the carbohydrate fraction of the wood by the acidic cooking liquor. The term "soluble-base" spent sulfite liquor also refers to spent sulfite liquors which were originally obtained by the acid-sulfite pulping of wood with sulfurous acid-bisulfite solutions of insoluble bases but which were subsequently converted to soluble base. Examples of such liquor would include ammonia- and sodium-base spent sulfite liquors prepared from calcium-base spent sulfite liquor by (1) treatment with ammonium or sodium sulfate or sulfite under pH conditions such that the calcium was substantially precipitated, or (2) cation exchange.

In a typical case, we may digest concentrated ammonia-base SSL to which sodium sulfite has been added. Increasing the amount of sodium sulfite added increases the rate of sugar conversion and solubility but tends to inhibit repolymerization. On the other hand, increasing the digestion temperature, time and concentration of spent sulfite liquor solids tends to speed up repolymerization as measured by viscosity increase at given total solids concentration and temperature. For different applications, the optimum degree of repolymerization will vary, but in no case will it be greater than that of the original material. In the case described above, the solution fed to the digestion step will be only slightly alkaline (e.g., 7–9.5), despite the alkaline nature of the sodium sulfite added, due to the acidity of the SSL. During digestion, the reactants form acid products so that the digestion product is substantially acidic (e.g., pH 3–5). The sugar conversion is thus not an alkaline degradation. Even where sodium sulfite is the reactant added to the SSL, the pH characteristics of the resulting liquor indicates that both sulfite and bisulfite are the active chemicals involved in digestion. For purposes of clarity in describing the operation of the invention, the digestion conditions will be specified in terms of the chemical added rather than in terms of what may be formed in solution.

In another typical case we may digest sodium base spent sulfite liquor with a mixture of ammonium sulfite and ammonium bisulfite, obtaining similar results although the product liquor is more acidic.

As mentioned, the invention can be satisfactorily practiced using sodium bisulfite as a partial or complete replacement for sodium sulfite as a digestion chemical added. Such a procedure will tend to give a more acidic digestion product than with sodium sulfite and will cause the sugar conversion to proceed at a reduced rate. For applications in which the presence of sodium ion is considered undesirable, the sodium content of the modified lignosulfonate products can be minimized by employing potassium rather than sodium salts of sulfurous acid.

Since the invention contemplates the use of a variety of salts of sulfurous acid, we find it convenient to express the quantity of digestion chemical in terms of a common reference — namely, the sulfur dioxide equivalent.

Broad and preferred conditions for carrying out the invention are tabulated below:

|  | Broad Conditions | Preferred Conditions |
| --- | --- | --- |
| Temperature, °C. | 80–200 | 140–170 |
| Concentration, % solids | 20– 55 | 40– 50 |
| Chemical (as $SO_2$), % of SSL solids | 2.0–40.0 | 3– 10 |

Digestion time is varied to give modified lignosulfonate products of the desired viscosity, but in no instance is the digestion time so long that the product liquor has viscosity greater than that of the original reaction mixture. Reaction time is dependent upon digestion temperature and quantity of digestion chemical but will usually fall within the range 15–120 minutes.

Although the digestion product may be used in its liquid form, it will often prove advantageous to dry the material. This is preferably accomplished under rapid drying conditions such as those which prevail in spray and drum drying. The products are not particularly heat sensitive.

It is known that bi- or polyvalent metals enhance the effectiveness of lignosulfonate dispersants when used in colloidal systems which do not already contain the metals. Since the digestion products of this invention are acid, they may be neutralized with calcium oxide or hydroxide or with other metal or alkali metal oxides or hydroxides to form partial salts of modified lignosulfonic acids. Alternately, in view of the complexing ability of the modified lignosulfonate products of this invention, bi- or polyvalent metals may be introduced as their soluble salts. Thus, there may be added to the digestion product zinc salts, aluminum salts, iron salts, manganese salts, chromic salts, sodium or potassium chromate or dichromate and other bi- or polyvalent metal salts. It is advantageous, when such bi- or polyvalent metals are to be incorporated with the digestion product, that the addition be made prior to drying. Also, the choice of which polyvalent metal, if any, is to be added may depend on whether there are color limitations for the intended use.

The products of the invention are effective dispersants or colloids for cement, ceramic clays, clays in oil well drilling muds, pigments such as titanium dioxide and zinc oxide, insecticide fillers, carbon particles, deposits in boilers and many other water-insoluble materials.

Complexing the digestion products of the invention with salts of those bi- and polyvalent metals which are plant micronutrients results in products which may be used in agricultural applications in place of chelates of these metals with relatively expensive organic chelating agents. The digestion products are also useful for complexing metals for industrial uses when it is desirable to minimize precipitation of metals on making solutions alkaline.

In related experiments with sugars, we have demonstrated that by the process of the invention, sugars are converted into products which are effective dispersants or deflocculants for clays, minerals such as zinc oxide, etc. To thus function as organic deflocculants, the products formed must be polymeric.

When repolymerization is allowed to proceed, however, in general, good solubility properties are nevertheless maintained due to sulfonation which has taken place. We therefore believe that one of the functions of the bisulfite and/or sulfite ions in the digestion may be to maintain solubility during sugar conversion and/or modified lignosulfonate polymerization and copolymerization.

The process of the invention is more specifically shown in the examples which follow. Where not specified, the spent sulfite liquors were derived from the acid sulfite pulping of coniferous woods, essentially western hemlock (Tsuga heterophylla), amabilis fir (Abies amabilis) and sitka spruce (Pices sitchensis), but predominantly western hemlock.

EXAMPLE I

The following example illustrates a key characteristic of the process of the invention—namely, that the reaction involves an initial depolymerization followed by repolymerization.

Concentrated spent sulfite liquors, derived from the acid-sulfite pulping of western hemlock wood chips, were mixed with ammonium, sodium and potassium salts of sulfurous acid and water, as indicated in the following table. In each instance, the mixture was transferred to a jacketed, agitated autoclave, heated to 165° C. with indirect steam, retained at 165° C. for 30–147 minutes (as indicated in the table) and cooled indirectly with water. During digestion, samples were periodically withdrawn from the autoclave and instantly cooled without the loss of water vapor. The viscosity of these samples was measured with a Brookfield viscometer. These viscosity data are plotted as a function of digestion time in FIGS. 1 and 2.

$Na_2SO_3$, containing 7.0 percent moisture, was dissolved in 3,620 grams of the 48.6 percent spent sulfite liquor. The concentration of this solution was then reduced to 45 percent solids by adding 591 grams water. This 45 percent solution, having a pH of 7.0 and a viscosity of 1,260 centipoises at 25° C., was placed in a jacketed, agitated autoclave, heated indirectly with steam to 165° C. in 16 minutes, retained at 165° C. for 30 minutes, cooled indirectly with water to 90° C. in 12 minutes and removed from the autoclave. The digested liquor had a pH of 3.0 and a viscosity of 324 centipoises at 25° C. Analysis of the liquor revealed that 97.5 percent of the $Na_2SO_3$ added had been consumed as a result of reactions occurring during digestion. The digested liquor was spray dried to give a light-brown powder containing 0.5 percent free sugars and 1.8 percent total sugars, determined by paper chromatography. As used in this and other examples, free sugars refers to the sum of the individual monosacchrides determined chromatographically on an aqueous product solution which has not been subjected to hydrolysis. Total sugars refers to the sum of the individual sugars determined chromatographically on an aqueous product solution which has been subjected to hydrolysis with sulfuric acid to convert polysaccharides or otherwise combined sugars into free monosaccharides.

The product produced as described in this example was an effective dispersant for cement slurries, and did not have the objectionable feature of retarding cure which characterized sugar-containing spent sulfite liquor solids.

EXAMPLE III

Spent sulfite liquor, having a solids concentration of 10.0 percent and derived from the digestion of western hemlock wood chips with sodium-base, acid-sulfite pulping liquor, was concentrated to 53.2 percent solids in a single-effect, forced-circulation evaporator operating at an absolute pressure of 5 psi in the vapor head. 276 grams $Na_2SO_3$, containing 7.0 percent moisture, was dissolved in 2,440 grams of the 53.2 percent sodium base spent sulfite liquor. The concentration of this solution was reduced to 45 percent total solids by adding 744 grams water. The 45 percent solution having a pH of 7.8 and a viscosity of 145 centipoises at 25° C., was then placed in a jacketed, agitated autoclave, heated indirectly with steam to 150° C. in 8 minutes, retained at 150° C. for 30 minutes, cooled indirectly with water to 90° C. in 6 minutes, and

MATERIALS IN MIXTURE FED TO AUTOCLAVE

| Figure Number | Curve No. | Spent sulfite liquor | | | Digestion chemical, parts by weight | | | | | | Ratio of digestion chemical (as $SO_2$) to spent sulfite liquor solids | Retention at 165° C., min. |
|---|---|---|---|---|---|---|---|---|---|---|---|---|
| | | Type | Parts by wt. | Conc., percent solids | $(NH_4)S_2O_3$ | $NH_4HSO_3$ | $Na_2SO_3$ | $NaHSO_3$ | $K_2SO_3$ | $H_2O$ | | |
| 1 | 1 | $NH_3$-base | 162 | 46.7 | | | 8.96 | | | 17.6 | .060 | 30 |
| 1 | 2 | Na-base | 204 | 49.0 | 5.44 | 4.64 | | | | 7.0 | .060 | 60 |
| 2 | 1 | do | 150 | 50.3 | | | | 12.28 | | 20.7 | .100 | 90 |
| 2 | 2 | do | 163.4 | 50.3 | | | | | 12.00 | 24.6 | .059 | 147 |

Figure 2:
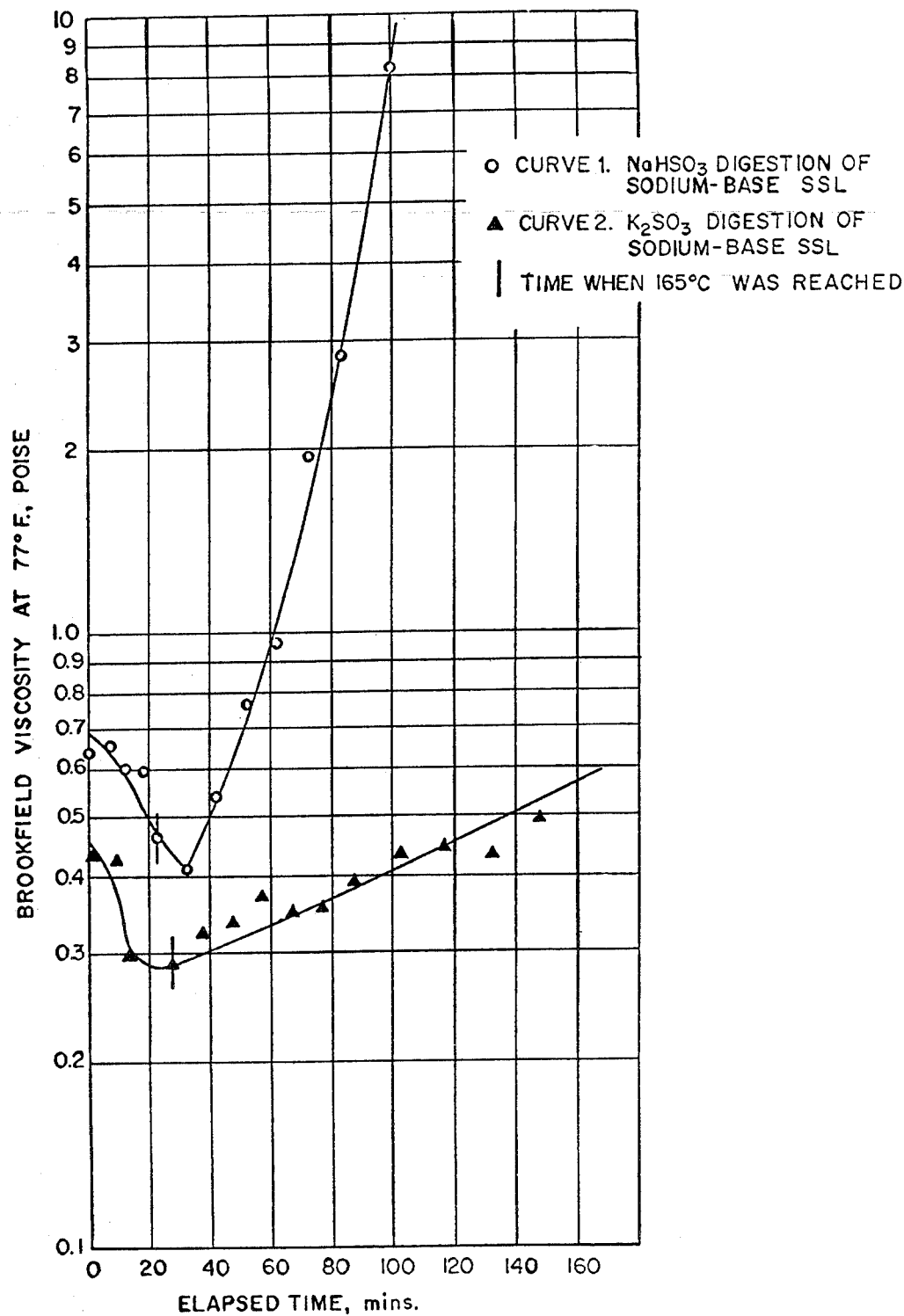

Referring to FIGS. 1 and 2, it will be seen that in each instance the viscosity of the digestion mixture initially decreased, reached a minimum, and thereafter increased.

EXAMPLE II

A wood chip mixture, comprising 79.1 percent western hemlock, 11.2 percent amabilis fir and 9.7 percent sitka spruce, was digested with ammonia-base, acid-sulfite pulping liquor to produce wood pulp of 12.9 permanganate number. The spent sulfite liquor derived from this wood digestion was characterized by paper chromatography and found to contain 27.2 percent total sugars and 25.8 percent free sugars on a dry basis. This liquor, recovered from the blowpit at 8 percent solids concentration, was concentrated to 48.6 percent solids in a single-effect, forced-circulation evaporator operating at an absolute pressure of 5 psi in the vapor head. 279 grams removed from the autoclave. The digested liquor had a pH of 5.8 and a viscosity of 54 centipoises at 25° C. This liquor was spray dried to give a light-brown powder containing 0.0 percent free sugars and 1.0 percent total sugars; determined chromatographically. By contrast, spray-dried sodium-base spent sulfite liquor solids contained 22.1 percent total sugars and 19.9 percent free sugars.

EXAMPLE IV

Spent sulfite liquor, having a solids concentration of 15.3 percent and derived from the digestion of western hemlock wood chips with sodium-base, acid-sulfite pulping liquor, was concentrated to 50.7 percent solids in a single-effect, forced-circulation evaporator operating at an absolute pressure of 5 psi in the vapor head. 187.5 grams $Na_2S_2O_5$, containing 5.0 percent moisture, was dissolved in 3,940 grams of the 50.7 percent sodium-base spent sulfite liquor. After this solution had been diluted with 260 grams water, 114.5 grams aqua ammonia (27.8 percent NH₃) was added to give a solution containing equimolar parts of Na₂SO₃ and (NH₄)₂SO₃. This solution, having a solids concentration of 48.3 percent, a pH of 6.1 and a viscosity of 323 centipoises at 25° C., was transferred to a jacketed, agitated autoclave, heated indirectly with steam to 165° C. in 18 minutes, retained 30 minutes at 165° C., cooled indirectly with water to 90° C. in 12 minutes and removed from the autoclave. The digested liquor had a pH of 3.0 and a viscosity of 219 centipoises at 25° C. It was spray dried to give a light-brown powder containing 1.9 percent free sugars and 3.5 percent total sugars, determined chromatographically.

EXAMPLE V

Spent sulfite liquor derived from the digestion of western hemlock wood chips with ammonia-base, acid-sulfite pulping liquor, was concentrated to approximately 53.2 percent solids in a single-effect, forced-circulation evaporator operated at an absolute pressure of approximately 5 psi in the vapor head. Sodium sulfite, equivalent to 6.0 percent $SO_2$ based on spent sulfite liquor solids, was dissolved in the concentrated spent sulfite liquor which contained approximately 25 percent total sugars, on a dry basis. This solution was placed in a jacketed, agitated autoclave, heated indirectly with steam to 165° C., retained at 165° C. for 30 minutes, cooled indirectly with water to 90° C., removed from the autoclave and spray dried. The spray-dried product was found to be an extremely effective deflocculant for reducing the viscosity of zinc oxide and cement slurries.

The above-digested liquor was diluted with water to 45 percent solids concentration. To 215 grams of this liquor was added 94.8 grams of a solution containing approximately equal proportions, based on chromium, of chromic sulfate and sodium dichromate, the total amount of chromium being 4.9 grams. This chromium-complexed, modified-lignosulfonate product was evaluated as a drilling mud additive as follows:

Illite clay was hydrated to give a slurry containing 42.5 percent solids. This slurry was converted to a gypsum-salt mud by the addition of sodium chloride and gypsum, equivalent to 4 lb./bbl. and 5 lb./bbl., respectively. To one portion of this mud was added the above chromium-complexed product in an amount equivalent to 5 lb./bbl. Another portion of mud was not treated with any additive. The two mud samples were adjusted to pH 9.5 with sodium hydroxide, aged 16 hours at 158° F. and tested by usual A.P.I. procedures. The results are tabulated below:

| Additive | Apparent Viscosity, Centipoises | Gel Strength lb./100 sq. ft. 0 min. | 10 min. |
|---|---|---|---|
| None | >150 | >150 | >150 |
| Chromium-complexed product | 14 | 5 | 19 |

The chromium-complexed, modified-lignosulfonate product thus converted the mud from a thick, unworkable material to a highly fluid condition.

EXAMPLE VI

The following is an example of a digestion carried out under mild conditions to produce a light-colored dispersant suitable for deflocculation of light-colored pigments as in latex-base paints.

Ammonia-base spent sulfite liquor was concentrated to 43.9 percent solids in a vacuum evaporator. After 3,853 grams of this concentrated liquor had been diluted with 249 grams water, 358 grams Na₂SO₃, containing 6.9 percent moisture, was dissolved therein to give a solution. This solution, containing 47.4 percent solids, having a pH of 8.1 and having a viscosity of 725 centipoises at 25° C., was placed in a jacketed, agitated autoclave, heated indirectly with steam to 130° C. for 10 minutes, retained at 130° C. for 60 minutes, cooled to 85° C. in 10 minutes, and removed from the autoclave. The digested liquor, containing 48.5 percent solids, having a pH of 5.3 and having a viscosity of 109 centipoises at 25° C., was spray dried to give a light-tan powder containing only 0.9 percent free sugars and 2.9 percent total sugars.

The product, when added in small amount to a slurry of titanium oxide, effected a marked reduction in viscosity without noticeably altering the color of the dispersed pigment.

EXAMPLE VII

The following data, Table I, show the effect of type and amount of digestion chemical, temperature, time and concentration on the degree to which sugars in ammonia-base and soda-base spent sulfite liquors are converted into other components.

TABLE I

| Type of spent sulfite liquor digested | Identity and amount of digestion chemical, percent of spent sulfite liquor solids | | | | | Maximum digestion temp., °C. | Time at maximum digestion temp., min. | Concentration of digested liquor, percent solids | pH of digested liquor | Analysis of spray-dried product | |
|---|---|---|---|---|---|---|---|---|---|---|---|
| | Na₂SO₃ (as SO₂) | NaHSO₃ (as SO₂) | (NH₄)₂SO₃ (as SO₂) | NH₄HSO₃ (as SO₂) | NH₄OH (as NH₃) | | | | | Free sugars, percent | Total sugars, percent |
| NH³-base | 2.5 | | | | | 150 | 60 | 24.0 | 3.6 | 5.7 | 7.2 |
| Do | 5.0 | | | | | 150 | 60 | 24.8 | 4.0 | 1.6 | 4.8 |
| Do | 10.0 | | | | | 150 | 60 | 24.7 | 5.3 | 0.3 | 2.1 |
| Do | 30.0 | | | | | 150 | 60 | 26.4 | 7.1 | Trace | 2.0 |
| Do | 10.0 | | | | | 130 | 60 | 49.8 | 6.0 | Trace | 1.7 |
| Do | 15.0 | | | | | 130 | 60 | 47.4 | 6.6 | 0.0 | 1.7 |
| Do | 20.0 | | | | | 130 | 60 | 49.1 | 6.8 | 0.0 | 0.8 |
| Do | 40.0 | | | | | 130 | 60 | 50.4 | 7.2 | 0.0 | 0.9 |
| Do | 10.0 | | | | | 80 | 60 | 46.6 | 7.3 | 5.1 | 8.0 |
| Do | 10.0 | | | | | 80 | 300 | 46.4 | 7.5 | 5.8 | 8.6 |
| Do | 10.0 | | | | | 100 | 60 | 46.5 | 7.1 | 6.2 | 8.5 |
| Do | 10.0 | | | | | 130 | 60 | 45.8 | 5.3 | 0.7 | 3.0 |
| Do | 10.0 | | | | | 140 | 60 | 44.7 | 5.0 | 0.0 | 2.7 |
| Do | 10.0 | | | | | 150 | 60 | 44.1 | 4.9 | 0.0 | 1.4 |
| Do | 10.0 | | | | | 155 | 60 | 44.5 | 4.8 | 0.0 | 1.0 |
| Do | 10.0 | | | | | 150 | 5 | 45.2 | 5.5 | 1.4 | 2.8 |
| Do | 10.0 | | | | | 150 | 10 | 44.6 | 5.45 | 1.3 | 2.8 |
| Do | 10.0 | | | | | 150 | 30 | 43.8 | 5.5 | 0.0 | 1.1 |
| Do | 10.0 | | | | | 150 | 60 | 44.1 | 4.9 | 0.0 | 1.4 |
| Do | 10.0 | | | | | 150 | 90 | 44.7 | 5.3 | 0.0 | 0.9 |
| Do | 10.0 | | | | | 150 | 120 | 44.3 | 4.4 | 0.0 | 0.9 |
| Do | 10.0 | | | | | 150 | 180 | 45.0 | 4.6 | 0.0 | 1.7 |
| Do | 10.0 | | | | | 150 | 300 | 45.2 | 4.6 | 0.0 | 1.0 |
| Do | 10.0 | | | | | 150 | 60 | 24.7 | 5.3 | 0.3 | 2.1 |
| Do | 10.0 | | | | | 150 | 60 | 39.4 | 5.3 | 0.0 | 1.1 |
| Do | 10.0 | | | | | 150 | 60 | 45.6 | 5.3 | 0.0 | 0.9 |
| Do | 10.0 | | | | | 150 | 60 | 53.4 | 6.5 | 0.0 | 1.0 |
| Do | | | 20.0 | | | 165 | 30 | 42.3 | 1.4 | 0.7 | 1.0 |
| Do | | 3.75 | 3.75 | | | 165 | 30 | 50.4 | 2.3 | 1.2 | 2.0 |

TABLE I—Continued

| Type of spent sulfite liquor digested | Identity and amount of digestion chemical, percent of spent sulfite liquor solids | | | | | Maximum digestion temp., °C. | Time at maximum digestion temp., min. | Concentration of digested liquor, percent solids | pH of digested liquor | Analysis of spray-dried product | |
|---|---|---|---|---|---|---|---|---|---|---|---|
| | Na$_2$SO$_3$ (as SO$_2$) | NaHSO$_3$ (as SO$_2$) | (NH$_4$)$_2$SO$_3$ (as SO$_2$) | NH$_4$HSO$_3$ (as SO$_2$) | NH$_4$OH (as NH$_3$) | | | | | Free sugars, percent | Total sugars, percent |
| Do | 5.32 | | | | 2.13 | 165 | 60 | 42.1 | 5.0 | 0.0 | 1.3 |
| Do | 5.32 | | | | 1.09 | 165 | 60 | 41.9 | 4.1 | 0.0 | 1.7 |
| Do | 5.0 | | 5.0 | | | 150 | 30 | 46.9 | 4.5 | 0.0 | 1.6 |
| Do | | | 10.0 | | | 150 | 30 | 45.3 | 4.5 | 0.0 | 1.6 |
| Do | | | | 10.0 | | 150 | 30 | 43.9 | 4.0 | 2.0 | 3.0 |
| Do | | | 5.0 | 5.0 | | 150 | 30 | 46.6 | 2.4 | 0.0 | 1.7 |
| Na-base | 10.0 | | | | | 150 | 60 | 24.8 | 6.2 | 0.0 | 0.4 |
| Do | 10.0 | | | | | 150 | 60 | 28.4 | 6.3 | 0.0 | 0.8 |
| Do | 5.0 | | | | | 150 | 30 | 50.6 | 5.2 | 2.3 | 3.8 |
| Do | 7.5 | | | | | 150 | 30 | 49.4 | 5.7 | 0.7 | 1.3 |
| Do | 10.0 | | | | | 150 | 30 | 50.0 | 6.4 | 0.0 | 2.3 |
| Do | 10.0 | | | | | 145 | 60 | 49.5 | 6.6 | 0.0 | 0.6 |
| Do | 5.0 | | | | | 130 | 60 | 46.3 | 5.1 | 6.6 | 8.3 |
| Do | 10.0 | | | | | 130 | 60 | 45.0 | 6.5 | 0.9 | 2.3 |
| Do | 3.0 | 3.0 | | | | 165 | 30 | 49.8 | 3.7 | 3.2 | 4.2 |
| Do | 10.0 | | | | 2.13 | 165 | 30 | 43.4 | 7.6 | 0.0 | 1.2 |
| Do | 5.0 | | 5.0 | | | 150 | 30 | 5.00 | 4.0 | Trace | 2.1 |
| Do | 3.0 | | 3.0 | | | 165 | 30 | 47.8 | 3.0 | 1.9 | 3.5 |
| Do | | | 10.0 | | | 150 | 30 | 42.7 | 4.7 | 0.0 | 2.0 |
| Do | | | 6.0 | | | 165 | 30 | 47.9 | 1.9 | 1.0 | 1.3 |
| Do | | | | 10.0 | | 150 | 30 | 41.7 | 2.0 | 2.6 | 4.1 |

EXAMPLE VIII 200 grams of corn sugar (glucose) and 100 grams Na$_2$SO$_3$ were dissolved in 600 ml. water and digested for 1 hour at 150° C. The digested solution, which had a pH of 5.8, was spray dried to give a light, tan-colored powder. This product, when added in small quantities to zinc oxide slurries, was found to be very effective as a deflocculant. Glucose alone or mixtures of glucose and sodium sulfite which had not been subjected to the above-described digestion were ineffective as deflocculants.

EXAMPLE IX 978 grams glucose, 496 grams sodium sulfite (containing 6.8 percent moisture), and 370 grams NH$_4$OH (29% NH$_3$) were dissolved in 1,391 grams water. In this solution, the ratios of sodium sulfite and ammonia to glucose (0.472 and 0.11 respectively) were the same as the ratios of sodium sulfite and ammonium ion (calculated as NH$_3$) to total sugars in Example V. The glucose-containing solution was adjusted with sulfuric acid to pH 7.5, the initial pH prevailing in Example V.

The glucose-containing solution was placed in an autoclave and digested for 30 minutes at 165° C. The digested solution was then reacted with a solution containing chromic sulfate and sodium dichromate (with one-half of the chromium in the form of sodium dichromate) equivalent to 4.9 percent chromium based on digested solution solids. The resulting solution was spray dried. Spectral curves of this sample showed the presence of furane rings.

The spray-dried sample, hereafter called Product B, was then tested by usual A.P.I. methods in a drilling mud comprising a 40 percent slurry of illite clay. The results which follow show the effectiveness of Product B as a dispersant for the clay.

| | pH | Viscosity, cp. | Yield Value | Gel Strength, lbs./100 sq. ft. 0 min. | 10 min. | fluid loss ml./30 min. |
|---|---|---|---|---|---|---|
| No additive | 7.7 | 27 | 36 | 30 | 34 | 23.6 |
| Product B | 7.4 | 17 | 14 | 13 | 22 | 19.6 |

EXAMPLE X

Ammonia-base spent sulfite liquor was concentrated under vacuum, digested with sodium sulfite at 130° C. and spray dried as described in Example VI. This material, containing sugar-conversion products and hereafter referred to as Product D, was mixed with concrete containing six sacks cement per cubic yard, the quantity of Product D added corresponding to 18 ounces per cubic yard concrete. The slump of the concrete was then adjusted to 3.5 inches by adding water. This concrete was poured into molds to form 6-inch diameter × 12-inch long cylinders which were cured in a constant humidity room and tested for compressive strength by standard A.S.T.M. procedures. The following results compare the Product D-treated concrete with concrete containing no dispersant.

| | Water Required to Obtain 3.5" Slump | | Compressive Strength psi | |
|---|---|---|---|---|
| | Gallons/ Sack Cement | Gallons/ Cu. Yd. Concrete | After 7 Days Cure | After 28 Days Cure |
| Concrete containing no additive | 5.50 | 33.0 | 3060 | 5670 |
| Concrete containing Product D | 4.71 | 28.3 | 3450 | 5820 |

These results demonstrate that Product D was effective in reducing the water requirements for a given slump, thus reducing the amount of shrinkage which occurs during cure, and in increasing the strength of the cured concrete.

EXAMPLE XI

Sodium sulfite was dissolved in concentrated ammonia-base spent sulfite liquor (SSL) to give a solution having a ratio of 0.10 SO$_2$ to SSL solids. Water was then added to dilute the solution to 43.5 percent solids. The solution was digested for 60 minutes at 130° C. and was then spray dried. The dried sample is hereafter called Product C.

Product C was evaluated as a cement dispersant by determining the extent to which it reduced the viscosity of a cement slurry, using the test procedure given below. In this evaluation, Product C was compared with a calcium lignosulfonate which had been prepared in sugar-free form by the precipitation process of U.S. Pat. No. Re. 18,268.

1. 300 grams cement and one gram additive (where used) were manually mixed with 140 ml. deionized water for 30 seconds and subsequently mixed for 2 minutes with a milk shake (Hamilton Beach) mixer.
2. The time required for the slurry to flow through an outflow-type viscometer, known as the Marsh funnel, was measured.

The following results were obtained:

| Material Added to Cement Slurry | Slurry Viscosity as Measured by Funnel Outflow Time, Seconds |
|---|---|

| | |
|---|---|
| Product C | 14.2 |
| Calcium Lignosulfonate | 15.6 |
| None | 21.2 |

The results show that a product prepared by the all-solution process of the invention was more effective than a lignosulfonate in which the dilution effect of sugars had been eliminated through a physical separation of basic calcium lignosulfonate from sugars.

EXAMPLE XII 965 grams Portland cement, 444 ml. distilled water and 2 grams additive, as identified in the table below, were mixed 5 minutes. The rate at which this cement slurry hydrated was determined by making periodic measurements of its viscosity at 93° F. with a Halliburton Consistometer (setting-time tester). Such viscosity measurements were terminated when a viscosity of 10 poises was reached, since setting is imminent at this point. Data obtained were as follows:

| Material Added to Cement Slurry | Sugar Content of Additive Total % | Sugar Content of Additive Free % | Data Pertaining to Rate at Which Cement Slurry Hydrated Viscosity of Slurry, poises at 93°F. | Elapsed Time, Hours |
|---|---|---|---|---|
| None | | | 10 | 8.50 |
| Product of Example 6 | 2.9 | 0.9 | 10 | 9.85 |
| Spray-dried, Ammonia-base SSL Solids | 14.7 | 10.6 | 3 | 10.75 |

These data show the setting time of cement slurry is retarded only slightly by the modified lignosulfonate product, but is greatly retarded by the sugar-containing, ammonia-base spent sulfite liquor solids. In the latter instance, the experiment was discontinued 54 minutes after the sample containing the modified lignosulfonate product had set, because the viscosity was still low (only 3 poises) and the rate of viscosity increase was not rapid, demonstrating that setting was destined to occur only after considerable additional time.

EXAMPLE XIII

Ammonia-base spent sulfite liquor (SSL), which had been concentrated under vacuum to 41.3 percent, was mixed with sodium sulfite equivalent to 10% $SO_2$ based on SSL solids. The resulting solution was digested 30 minutes at 170° C. The digested liquor (4.2 pH, 46.1 percent solids) was mixed with ferric sulfate solution, equivalent to 20.0 percent iron based on digested liquor solids. This solution (38.2 percent solids) was heated to 80° C., retained 30 minutes at this temperature and spray dried. Product analyses, expressed on a dry basis, were as follows:

| | |
|---|---|
| Total Iron | 11.5% |
| Iron Soluble in 1% Solution Adjusted with NaOH to pH 8.0 | 11.4% |
| Iron Soluble in 1% Solution Adjusted with NaOH to pH 10.0 | 11.2% |

This demonstrates that a product of the invention complexes a substantial quantity of iron in a manner such that the metal remains soluble under alkaline conditions—conditions under which uncomplexed iron would precipitate as the hydroxide.

EXAMPLE XIV

This example illustrates the preparation of effective dispersants by the process of the invention using spent sulfite liquors derived from the acid-sulfite pulping of hardwoods.

Spent sulfite liquors (SSL) obtained through the acid-sulfite pulping of cottonwood (Populus trichocarpa) with sodium- and ammonia-base pulping liquors were concentrated under vacuum. The concentrated liquors were then digested with $NH_4HSO_3$—$(NH_4)_2SO_3$ or $Na_2SO_3$ solutions at 165° C. to produce modified lignosulfonate liquors, as summarized in Table II. The modified lignosulfonate products were spray dried and evaluated to determine their effectiveness in dispersing cement in mortars so as to improve the workability of these mortars at a constant ratio of water to cement to sand.

This was accomplished by preparing batches of mortar containing 240 gm. Type I cement (as defined by Designation C—150 of the American Society for Testing Materials, ASTM), 1,200 gm. sand (1.1 percent moisture), 240 gm. water and 0–1.00 gm. modified lignosulfonate. The mortars were mixed in accordance with the procedure specified in ASTM Designation C—305. The modified lignosulfonate products, when used, were added to the water prior to the addition of the cement and sand. The workability of each batch of mortar was determined by measuring the depth to which a freely-falling, 200-gram aluminum cone (3-⅝ inches in height, base diameter of 1-⅝ inches) penetrated the mortar, the degree of workability being proportional to the depth of penetration. A detailed description of this method is given in a paper by William A. Cordon, published in the January, 1960 issue of the JOURNAL OF THE AMERICAN CONCRETE INSTITUTE, pages 569–580. The effectiveness of the various modified lignosulfonate products in improving the workability of untreated mortar is shown by the data of Table III.

TABLE II

| Product | Properties of SSL, based used in sulfite pulping liquor | Modification of SSL by Digestion | | | Maximum temp., °C. | Time at maximum temp., min. | Properties of digested liquor | | |
|---|---|---|---|---|---|---|---|---|---|
| | | Quantity of chemicals percent (as $SO_2$) of SSL solids | | | | | pH | Viscosity, poises at 77° F. | Conc., percent solids |
| | | $NH_4HSO_3$ | $(NH_4)_2SO_3$ | $Na_2SO_3$ | | | | | |
| 1 | Na | 3.0 | 3.0 | | 165 | 30 | 2.45 | 0.14 | 39.8 |
| 2 | Na | 3.5 | 3.5 | | 165 | 30 | 2.30 | 0.135 | 40.0 |
| 3 | $NH_3$ | | | 6.0 | 165 | 30 | 2.90 | 0.20 | 43.7 |
| 4 | $NH_3$ | | | 7.0 | 165 | 30 | 3.35 | 0.19 | 44.1 |

TABLE III

| Modified lignosulfonate (i.e., admixture) added to mortar | | Properties of mortar | | | Workability, depth of cone penetration, mm. |
|---|---|---|---|---|---|
| Product | Wt., gm. | Ratio of— | | | |
| | | Admixture to cement | Water to cement | Sand to cement | |
| None | | | 0.48 | 2.40 | 55 |
| 1 | 10.0 | .0020 | 0.48 | 2.40 | 86 |
| 2 | 1.00 | .0020 | 0.48 | 2.40 | 87 |
| 3 | 1.00 | .0020 | 0.48 | 2.40 | 87 |
| 4 | 1.00 | .0020 | 0.48 | 2.40 | 87.5 |

We claim:
1. An aqueous drilling mud consisting essentially of a clay-water slurry having included therein a dispersant composition, said dispersant composition being prepared by forming a reaction mixture by incorporating a soluble sulfurous acid salt of sodium, potassium or ammonia into an aqueous solution containing soluble-base spent sulfite liquor including the reducing sugars from the sulfite pulping of wood having a total solids concentration of from about 20 to 55 percent, said soluble sulfurous acid salt being incorporated in an amount equivalent to 2 to 40 percent of $SO_2$ based on said total solids, heating the reaction mixture at a temperature within the range of from about 80° to 200° C. for a period of about 15–120 minutes, during which heating period the viscosity of said mixture decreases to a minimum and the SO$_2$ therein is substantially consumed, terminating the reaction at a point where the viscosity of the mixture does not exceed that of the reaction mixture prior to heating, and complexing said mixture with an amount of a chromium salt sufficient to provide a mixture having a chromium content equivalent to up to about 5 percent (based on the solids content of said mixture), said chromium salt being selected from the group consisting of sodium chromate, potassium chromate, sodium dichromate, potassium dichromate, chromium sulfate and mixtures thereof.

2. An aqueous drilling mud consisting essentially of a clay-water slurry having included therein a dispersant composition, said dispersant composition being prepared by forming a reaction mixture by incorporating a soluble sulfurous acid salt of ammonia into an aqueous solution containing sodium-base spent sulfite liquor including the reducing sugars from the sulfite pulping of wood having a total solids concentration of 20 to 55 percent, said soluble sulfurous acid salt being incorporated in an amount equivalent to 2.0 to 40 percent of SO$_2$ based on said total solids, and heating the resulting mixture at a temperature of from about 80° to 200° C. for a period of about 15–120 minutes to form a digestion mixture, terminating said heating at a point where the viscosity of said digestion mixture does not exceed that of the mixture prior to heating, and complexing said digestion mixture with an amount of a chromium salt sufficient to provide a mixture having a chromium content equivalent to up to about 5 percent (based on the solids content of said digestion mixture), said chromium salt being selected from the group consisting of sodium chromate, potassium chromate, sodium dichromate, potassium dichromate, chromium sulfate and mixtures thereof.

* * * * *